US012561264B2

(12) United States Patent
Chellappan et al.

(10) Patent No.: US 12,561,264 B2
(45) Date of Patent: Feb. 24, 2026

(54) SCALABLE DATA STRUCTURE FOR AGGREGATING BMC INPUT AND OUTPUT OVER SERDES FOR DATA CENTER AND SERVER NODES SYSTEM AND METHOD

(71) Applicant: Lattice Semiconductor Corporation, Hillsboro, OR (US)

(72) Inventors: Satheesh Chellappan, El Dorado Hills, CA (US); Munir Ahmad, Leander, TX (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 18/744,582

(22) Filed: Jun. 14, 2024

(65) Prior Publication Data

US 2025/0384003 A1      Dec. 18, 2025

(51) Int. Cl.
*G06F 13/38* (2006.01)
*G06F 13/28* (2006.01)
*G06F 13/42* (2006.01)

(52) U.S. Cl.
CPC ........ *G06F 13/282* (2013.01); *G06F 13/4282* (2013.01); *G06F 2213/0026* (2013.01); *G06F 2213/3808* (2013.01)

(58) Field of Classification Search
None
See application file for complete search history.

(56) References Cited

U.S. PATENT DOCUMENTS

| | | | | |
|---|---|---|---|---|
| 9,032,102 B2 * | 5/2015 | Granovsky | ............. | G06F 13/36 |
| | | | | 710/3 |
| 11,106,616 B1 * | 8/2021 | Wu | ..................... | G06F 13/4221 |
| 11,983,540 B1 * | 5/2024 | Cudak | ................. | G06F 13/4282 |
| 12,248,708 B2 * | 3/2025 | Chang | .................. | G06F 3/0679 |
| 12,332,990 B2 * | 6/2025 | Paulraj | ................... | G06F 21/83 |
| 2009/0248973 A1 * | 10/2009 | Deshpande | ......... | G06F 13/4226 |
| | | | | 711/108 |
| 2012/0166690 A1 * | 6/2012 | Regula | ................. | G06F 13/404 |
| | | | | 710/104 |

(Continued)

OTHER PUBLICATIONS

'PCI Express Base Specification Revision 1.0a' Apr. 15, 2003. (Year: 2003).*

(Continued)

*Primary Examiner* — Steven G Snyder

(74) *Attorney, Agent, or Firm* — Haynes and Boone, LLP

(57)      ABSTRACT

A system, method, and computer program product for communicating between a baseboard management controller (BMC) and a host processing module (HPM) are provided. A PCIe endpoint receives packets, such as TLPs, over a first communication interface from a BMC, where payloads in packets include transactions. The PCIe endpoint extracts the transactions from the payloads of packets. An address decoder decodes, using information in the transactions, addresses of the memory spaces corresponding to physical functions of the PCIe endpoint and second communication interfaces. The memory spaces store the transactions according to the decoded addresses. The second communication interface receives the transactions from the memory spaces and transmits the transactions to the HPM.

20 Claims, 9 Drawing Sheets

200

(56) References Cited

U.S. PATENT DOCUMENTS

| | | | |
|---|---|---|---|
| 2013/0232279 A1* | 9/2013 | Adar | G06F 13/36 |
| | | | 710/3 |
| 2018/0074717 A1* | 3/2018 | Olarig | G06F 11/3051 |
| 2018/0074984 A1* | 3/2018 | Olarig | G06F 13/36 |
| 2023/0051825 A1* | 2/2023 | Chang | G06F 3/061 |
| 2024/0012763 A1* | 1/2024 | Jang | G06F 12/123 |
| 2024/0211316 A1* | 6/2024 | Cudak | G06F 9/5033 |
| 2024/0232116 A1* | 7/2024 | Huang | G06F 15/7839 |
| 2024/0296255 A1* | 9/2024 | Paulraj | G06F 21/725 |
| 2024/0297901 A1* | 9/2024 | Paulraj | H04L 63/20 |
| 2024/0303313 A1* | 9/2024 | Paulraj | G06F 21/33 |
| 2024/0303339 A1* | 9/2024 | Paulraj | H04L 9/0643 |
| 2024/0305633 A1* | 9/2024 | Paulraj | H04L 63/0876 |
| 2024/0311482 A1* | 9/2024 | Paulraj | G06F 21/85 |
| 2024/0313983 A1* | 9/2024 | Ponnuru | H04L 9/3268 |
| 2025/0131111 A1* | 4/2025 | Cho | G06F 21/606 |
| 2025/0199726 A1* | 6/2025 | Chang | G06F 3/0679 |

OTHER PUBLICATIONS

'Project Argus DC-SCM 2.0—Revision 1.0' May 15, 2023. (Year: 2023).*
'DC-SCM 2.0 LVDS Tunneling Protocol & Interface (LTPI) Introduction' PowerPoint from OCP Global Summit, Nov. 2021. (Year: 2021).*

* cited by examiner

Figure 4A:
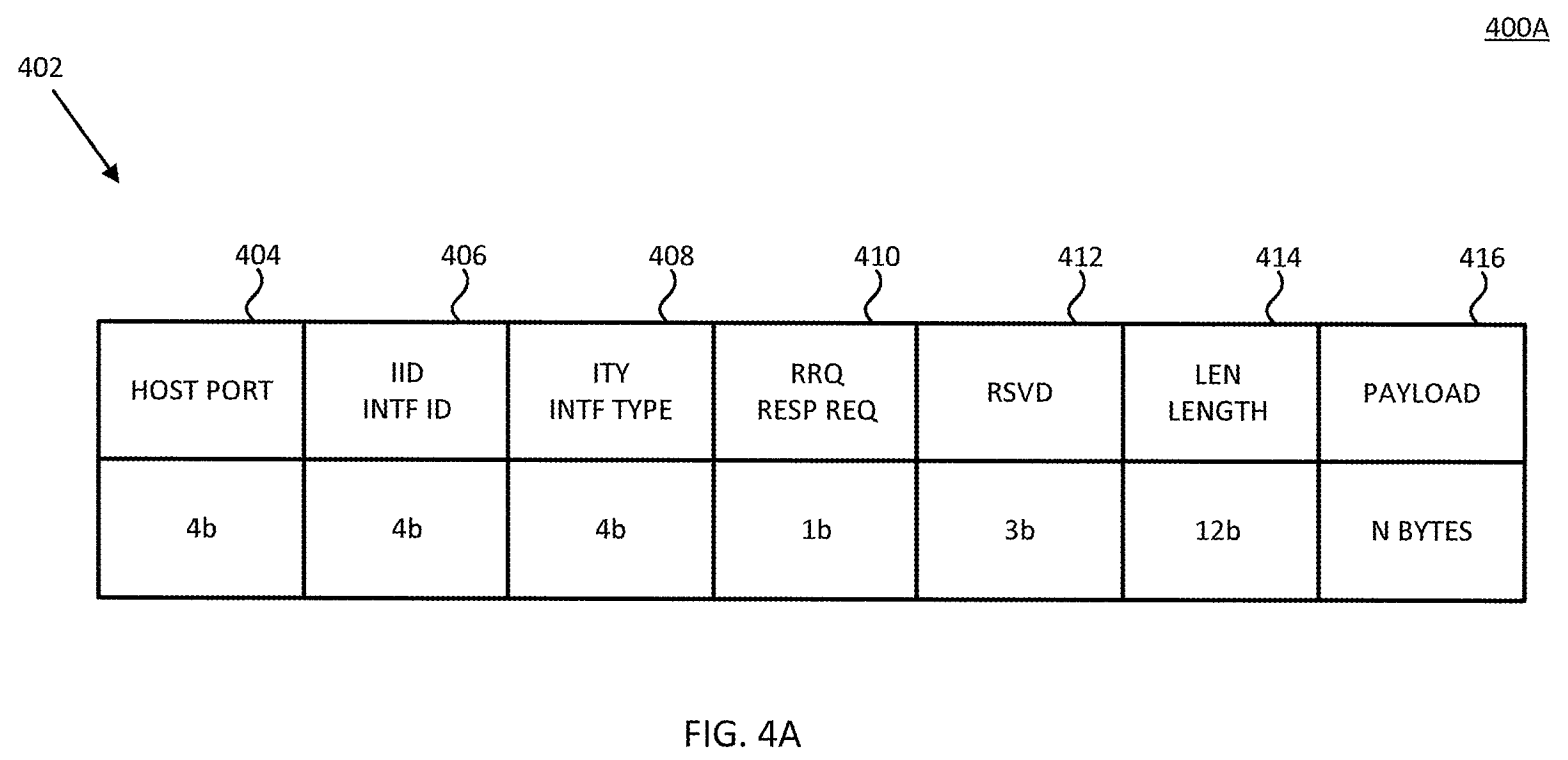

400A

| HOST PORT | IID<br>INTF ID | ITY<br>INTF TYPE | RRQ<br>RESP REQ | RSVD | LEN<br>LENGTH | PAYLOAD |
|-----------|----------------|------------------|------------------|------|---------------|---------|
| 4b | 4b | 4b | 1b | 3b | 12b | N BYTES |

| HOST PORT | IID INTF ID | ITY INTF TYPE | CCO COMP CODE | LEN LENGTH | PAYLOAD |
|---|---|---|---|---|---|
| 4b | 4b | 4b | 4b | 12b | M BYTES |

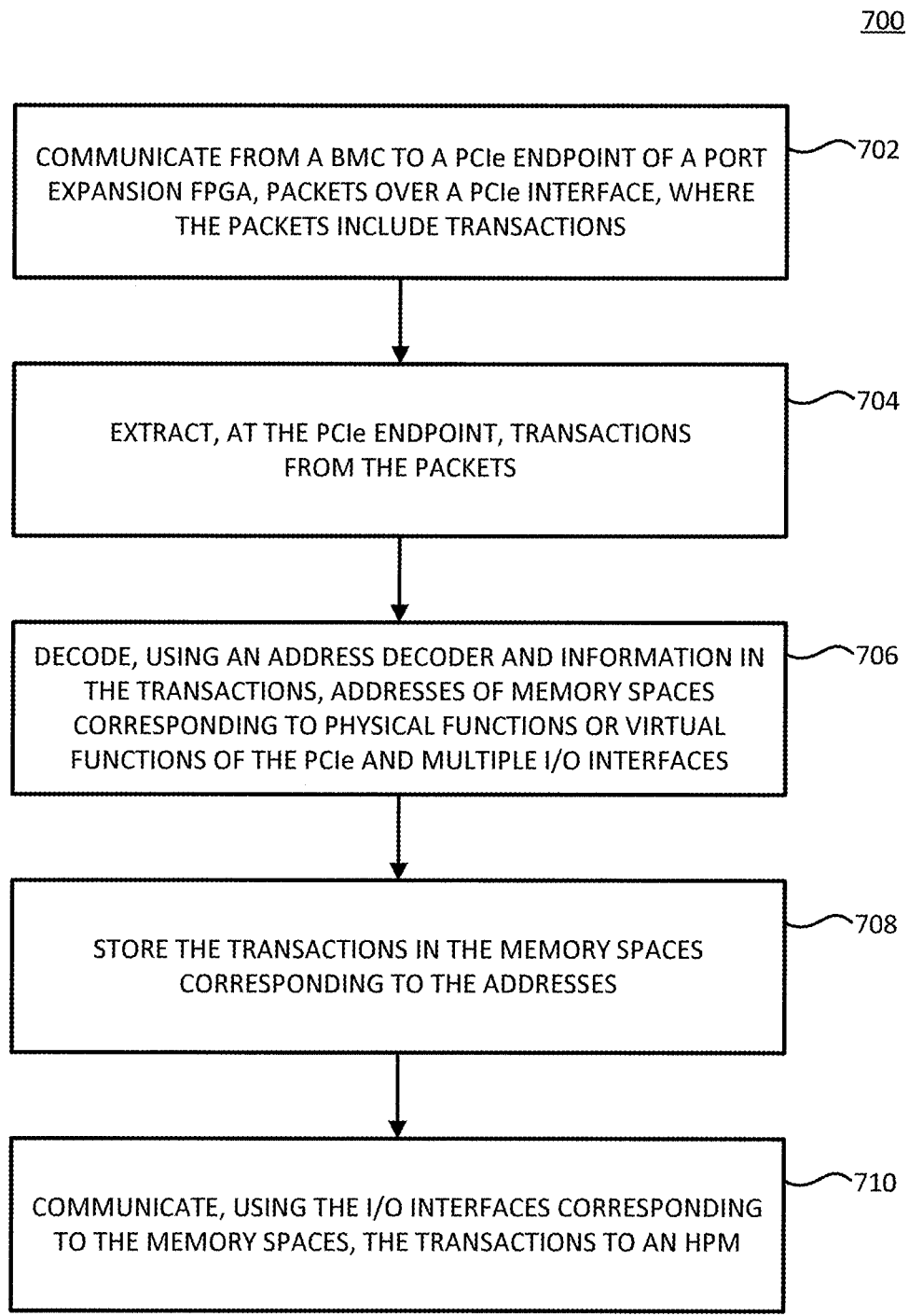

700

COMMUNICATE FROM A BMC TO A PCIe ENDPOINT OF A PORT EXPANSION FPGA, PACKETS OVER A PCIe INTERFACE, WHERE THE PACKETS INCLUDE TRANSACTIONS ⟋702

EXTRACT, AT THE PCIe ENDPOINT, TRANSACTIONS FROM THE PACKETS ⟋704

DECODE, USING AN ADDRESS DECODER AND INFORMATION IN THE TRANSACTIONS, ADDRESSES OF MEMORY SPACES CORRESPONDING TO PHYSICAL FUNCTIONS OR VIRTUAL FUNCTIONS OF THE PCIe AND MULTIPLE I/O INTERFACES ⟋706

STORE THE TRANSACTIONS IN THE MEMORY SPACES CORRESPONDING TO THE ADDRESSES ⟋708

COMMUNICATE, USING THE I/O INTERFACES CORRESPONDING TO THE MEMORY SPACES, THE TRANSACTIONS TO AN HPM ⟋710

FIG. 7

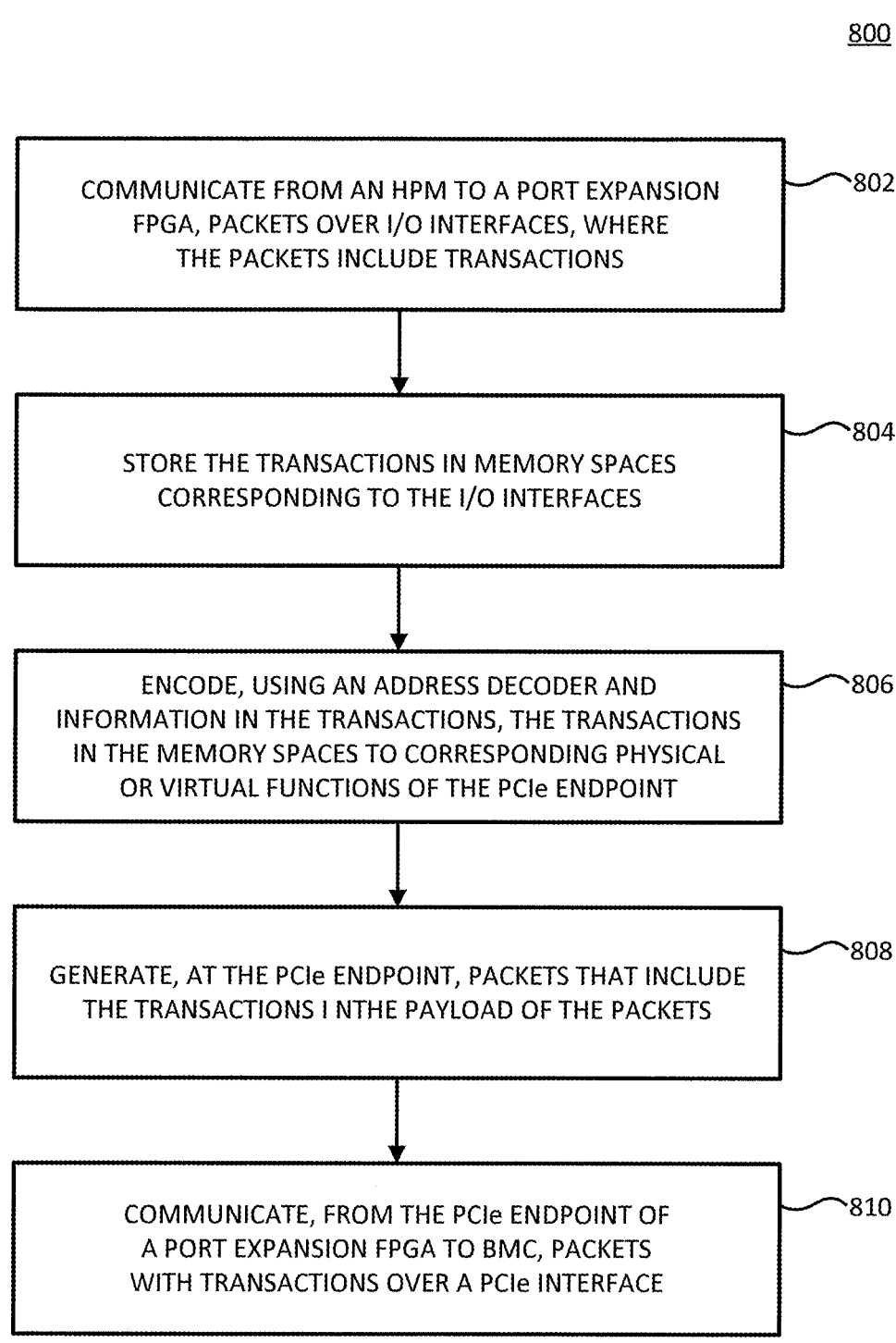

800

COMMUNICATE FROM AN HPM TO A PORT EXPANSION FPGA, PACKETS OVER I/O INTERFACES, WHERE THE PACKETS INCLUDE TRANSACTIONS — 802

STORE THE TRANSACTIONS IN MEMORY SPACES CORRESPONDING TO THE I/O INTERFACES — 804

ENCODE, USING AN ADDRESS DECODER AND INFORMATION IN THE TRANSACTIONS, THE TRANSACTIONS IN THE MEMORY SPACES TO CORRESPONDING PHYSICAL OR VIRTUAL FUNCTIONS OF THE PCIe ENDPOINT — 806

GENERATE, AT THE PCIe ENDPOINT, PACKETS THAT INCLUDE THE TRANSACTIONS I NTHE PAYLOAD OF THE PACKETS — 808

COMMUNICATE, FROM THE PCIe ENDPOINT OF A PORT EXPANSION FPGA TO BMC, PACKETS WITH TRANSACTIONS OVER A PCIe INTERFACE — 810

FIG. 8

SCALABLE DATA STRUCTURE FOR AGGREGATING BMC INPUT AND OUTPUT OVER SERDES FOR DATA CENTER AND SERVER NODES SYSTEM AND METHOD

TECHNICAL FIELD

The disclosure generally relates to communication between a baseboard management controller and a host, and more specifically to establishing communication between BMC and the host over PCIe.

BACKGROUND

A baseboard management controller (BMC), a secure control module (SCM), and a host processing module (HPM) agent chips have a limited number of input/output (I/O) pins (e.g., around 115 pins) to interface with different peripherals in the platform for power, thermal, and other management functions. The I/O interface could be a low speed interface, such as I2C, SPI, etc., or a medium bandwidth interface, such as USB 2.0, etc. Further, the I/O interface for some peripherals may not be defined at all causing the I/O commands and data from these peripherals to be routed directly, which costs additional I/O pins. The direct routing also leads to cost associated with the I/O bumps on both ends of the agent chip, the cost of additional cabling, and the printed circuit board (PCB) cost of routing the I/O.

BRIEF DESCRIPTION OF THE DRAWINGS

FIGS. 4A-B are diagrams of data structures that facilitate communications between a BMC and an HPM, according to some embodiments.

FIGS. 7-8 are flowcharts of exemplary methods for communicating between a BCM and an HPM, according to some embodiments.

Embodiments of the present disclosure and their advantages are best understood by referring to the detailed description that follows. It should be appreciated that like reference numerals are used to identify like elements illustrated in one or more of the figures.

DETAILED DESCRIPTION

Conventionally, in a data center server, a baseboard management controller (BMC), a CPU, and other peripherals may be on the same motherboard. In this case, the connections between the BMC and the other peripheral devices may be placed on a motherboard.

A BMC may also be separate from the motherboard. In this scenario, there may be input/output (I/O) interfaces that connect the BMC and the peripheral devices on the motherboard. The I/O interfaces for connecting the BMC to the peripheral devices have a limited number of pins, e.g., 115 pins, for transferring signals, e.g., data and commands, between the BMC and the peripheral devices. The limited number of pins may create blockage for signals that are transferred between the BMC and the peripheral devices.

A Low-Voltage Differential Signaling (LVDS) tunneling protocol interface (TPI), collectively known as LTPI, may support certain I/O interfaces, such as I2C, GPIO, UART, and may be used to transfer signals. However, signals from BMC may also be sent using other types of I/O interfaces, which are not compatible with the LTPI. In this case, the I/O interfaces may use a limited number of pins to transfer the signals.

The embodiments are directed to an architecture capable of establishing a high-speed or medium speed communication between a BMC and a host processing module (HPM) of a host using virtual channels. The host uses a Peripheral Component Interconnect Express (PCIe) or another SerDes to communicate with the BMC for streaming data, which is a high speed communication. The PCIe may be leveraged with physical and virtual functions to aggregate synchronous and asynchronous I/O transmissions from the peripheral devices. Specifically, the BMC establishes a communication interface with a port expansion FPGA over the PCIe. The port expansion FPGA establishes a connection over a direct I/O interface, such as LTPI, with HPM. The BMC and the port expansion FPGA aggregate synchronous and asynchronous I/O using command and data structures that are formatted into PCIe transaction layer packets (TLPs) and transmitted over direct I/O, such as LTPI.

Figure 1:
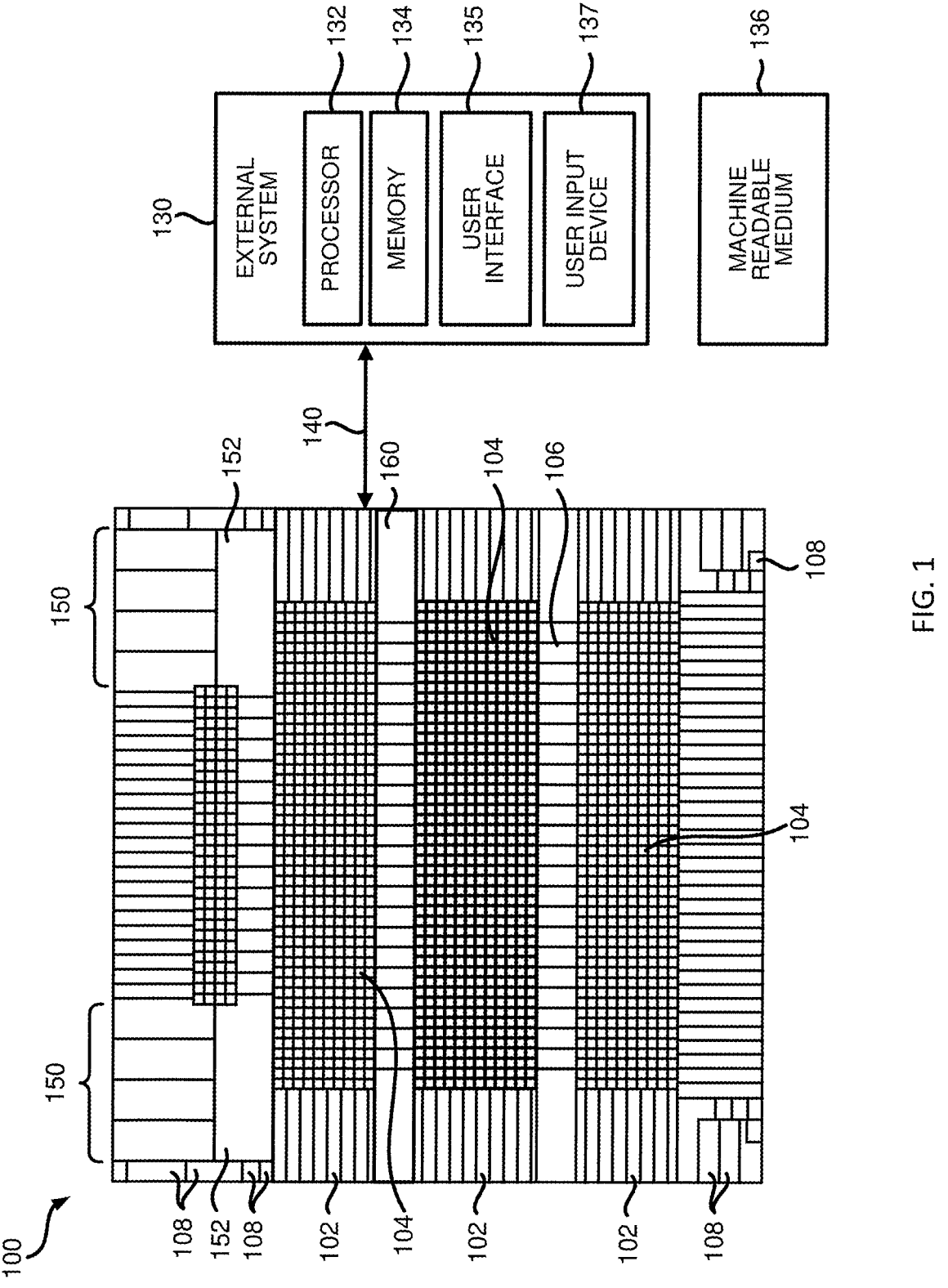
FIG. 1 illustrates a block diagram of a programmable logic device (PLD) in accordance with an embodiment.

FIG. 1 illustrates a block diagram of a programmable logic device (PLD) 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SerDes) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SerDes blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, system 130 may provide such configuration data to one or more I/O blocks 102, SerDes blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

PLD 100 (which may also be an FPGA) may be associated with a BMC and another PLD 100 may be associated with an HPM. PLD 100 may interact with a BMC over a PCIe interface and PLD 100 may interact with an HPM over an LTPI.

A BMC is a specialized processor that remotely monitors the physical state of peripheral devices of a host. A host may be a computer, a network server, a storage device, or another hardware device in a data center. The BMC may use sensors to measure the physical variables at the host. These physical variables may include temperature, humidity, power supply surge, fan speeds, communications parameters, operating system functions, firmware updates, BIOS installations, and the like. If the BMC identifies a failure or a physical variable with a value that is outside of the expected values, the BMC may generate an alert.

Due to numerous peripheral devices, the BMC may have multiple connections to the HPM, which may cause it to exceed the number of available pins for these connections. Accordingly, the embodiments are directed to an architecture that establishes a communication between a BMC and an HPM using virtual channels. Specifically, since the host uses PCIe for high speed media streaming, the BMC establishes a communication between BMC and a port expansion FPGA over the PCIe and between the port expansion FPGA and the HPM over direct I/O interfaces. The synchronous and asynchronous I/O transmissions between the BMC and the HPM are aggregated and encapsulated using physical and virtual functions, and are communicated using PCIe and direct I/O interfaces.

Figure 2:
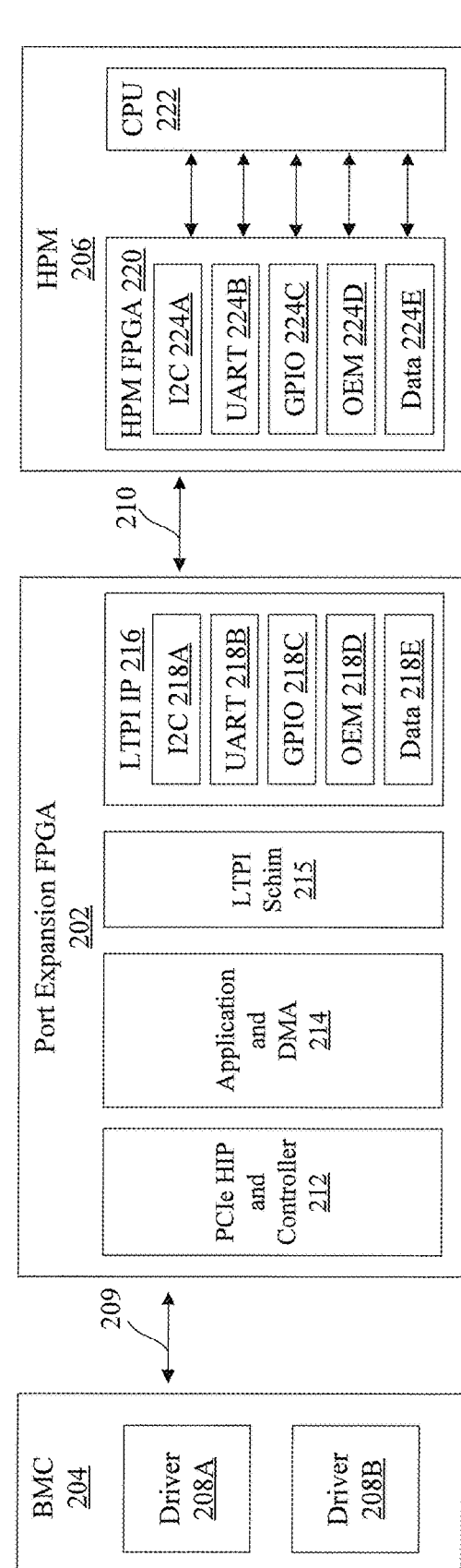
FIG. 2 illustrates a block diagram of an example software architecture for establishing a communication interface between a baseboard management controller (BMC) and a host processing module (HPM) of a host, according to some embodiments.

FIG. 2 is a block diagram 200 of an architecture that establishes a communication interface between a BMC and an HPM, according to some embodiments. The architecture includes a port expansion FPGA 202, a BMC 204, and an HPM 206. Port expansion FPGA 202 may provide an interface that connects BMC 204 to HPM 206. Port expansion FPGA 202 may aggregate I/O transmissions from BMC 204 received over a communication interface 209, such as a x1 PCIe lane, and establish communication between BMC 204 and HPM 206 over a communication interface 210. The communication interface 210 may comprise direct I/O interfaces over an LTPI, data center secure control interface (DC-SCI), LVDS, or another interface.

BMC 204 executes an operating system (OS), which may be a Linux OS. The OS may have multiple drivers 208, such as drivers 208A and 208B. Drivers 208 may be downloaded onto BMC 204 over a network either by a third-party or by an entity that developed the port expansion FPGA 202. Drivers 208 may be software stack support PCIe EP kernel drivers and virtual I/O drivers. In some instances, driver 208A may be a PCIe kernel-mode driver (KMD) and driver 208B may be a user-mode driver (UMD). The PCIe kernel-mode driver (KMD) may support PCIe transaction layer packets (TLPs) that are transmitted from BMC 204 to port expansion FPGA 202 over communication interface 209. Additionally, PCIe kernel-mode driver (KMD) may initialize and manage an application layer which may be responsible for completion code and errors that occur during the transmissions.

Driver 208B may support different virtual I/Os that may be associated with multiple peripheral devices. Additionally, driver 208B may include virtual I/O identifiers, various rules, including priority rules for transmissions and mapping of data and commands between virtual interface identifiers, physical functions, and I/O interfaces.

Port expansion FPGA 202 may include a PCIe hard IP (HIP) and controller 212, an application and DMA 214, an LTPI Schim 115, and an LTPI IP 216.

PCIe HIP and controller 212 are hardware components that implement a PCIe interface for communication between BMC 204 and port expansion FPGA 202. BMC 204 may support aggregation of I/O signals over communication interface 209. For example, BMC 204 may encapsulate the I/O access command, such as I2C read/write, into custom messages that are formatted according to the mapping in driver 208B. The custom messages may be included in TLPs that are transmitted over communication interface 209 to PCIe HIP and controller 212.

Application and DMA 214 may be responsible for reading and writing data to/from BMC 204 and HPM 206 using direct memory access (DMA). Application and DMA 214 may map different I/O groups to the DMA channels. The DMA channels may follow the priority defined by the application. The DMA and the memory spaces, such as FIFO, may act as a clock crossing buffer between the PCIe interface and the LTPI.

LTPI Schim 215 may convert the I/O payload to be compliant with the LTPI protocol that uses LTPI IP 216. For example, the Inter-Integrated Circuit (I2C) write payload, may be forwarded to LTPI IP 216, and the I2C read command may initiate a read over LTPI IP 216 before responding the read data over the PCIe interface.

Port expansion FPGA 202 may include an LTPI IP 216. LTPI IP 216 allows for tunneling of various I/O interfaces 218, such as an I2C 218A, a universal asynchronous receiver/transmitter (UART) 218B, a general purpose input/output (GPIO) 218C, an Original Equipment Manufacturer (OEM) interface 218D, and a data interface 218E, among others. GPIO 218C may include a pre-configured number of pins, such as eight pins for GPI and eight pins for GPO. The I/O interfaces 218 may communicate with HPM 206 using communication interface 210, which may be a data center secure control interface (DC-SCI) or another interface. Notably, I/O interfaces 218 are not limited to the above interfaces, and the embodiments may also include other interfaces, such as a serial peripheral interface (SPI), a pulse density modulation (PDM) interface, a time division multiplexed (TDM)/Inter-CI sound (I2S) interface, a serial wire debug (SWD) interface, a system power management interface (SPMI), an auxiliary interface (AUX (U-C)), and a Linux transmitter/receiver (LXTX/RX) interface, to name a few examples.

Port expansion FPGA 202 may de-aggregate the individual TLPs using virtual functions to individual I/O interfaces 218, such as I/O interfaces 218A-E. Physical functions (PFs) are used to route the I/O access by mappings PFs to direct interfaces 218A-E. For example I2C 218A_1 and I2C 218_2 are mapped to PF #0, UART 218B is mapped to PF #1, and GPIO 218C is mapped to PF #2. There may be an additional number of PFs that may be not be mapped by port expansion FPGA 202. Further, the PFs may be accessed using a memory mapped I/O (MMIO), as discussed below.

HPM 206 may include an HPM FPGA 220 and a controller, such as control processing unit (CPU) 222. HPM FPGA 220 may include I/O interfaces 224, such as I/O interfaces 224A-E that are counterparts to I/O interfaces 218A-E, which may be directly connected to I/O interfaces 218A-E via communication interface 210. As discussed above, the connection may be a DC-SCI interface or another interface. HPM FPGA 220 may extract command and data from the transactions passed using I/O interfaces 224A-E, and execute the commands and/or process the data using CPU 222. For example, CPU 222 may execute instructions that store data within HPM 206, or retrieve data in response to the instructions in a command, e.g., data including sensor data, and cause HPM FPGA 220 to format the data into transactions and transmit to BMC 204 via port expansion FPGA 202.

Figure 3:
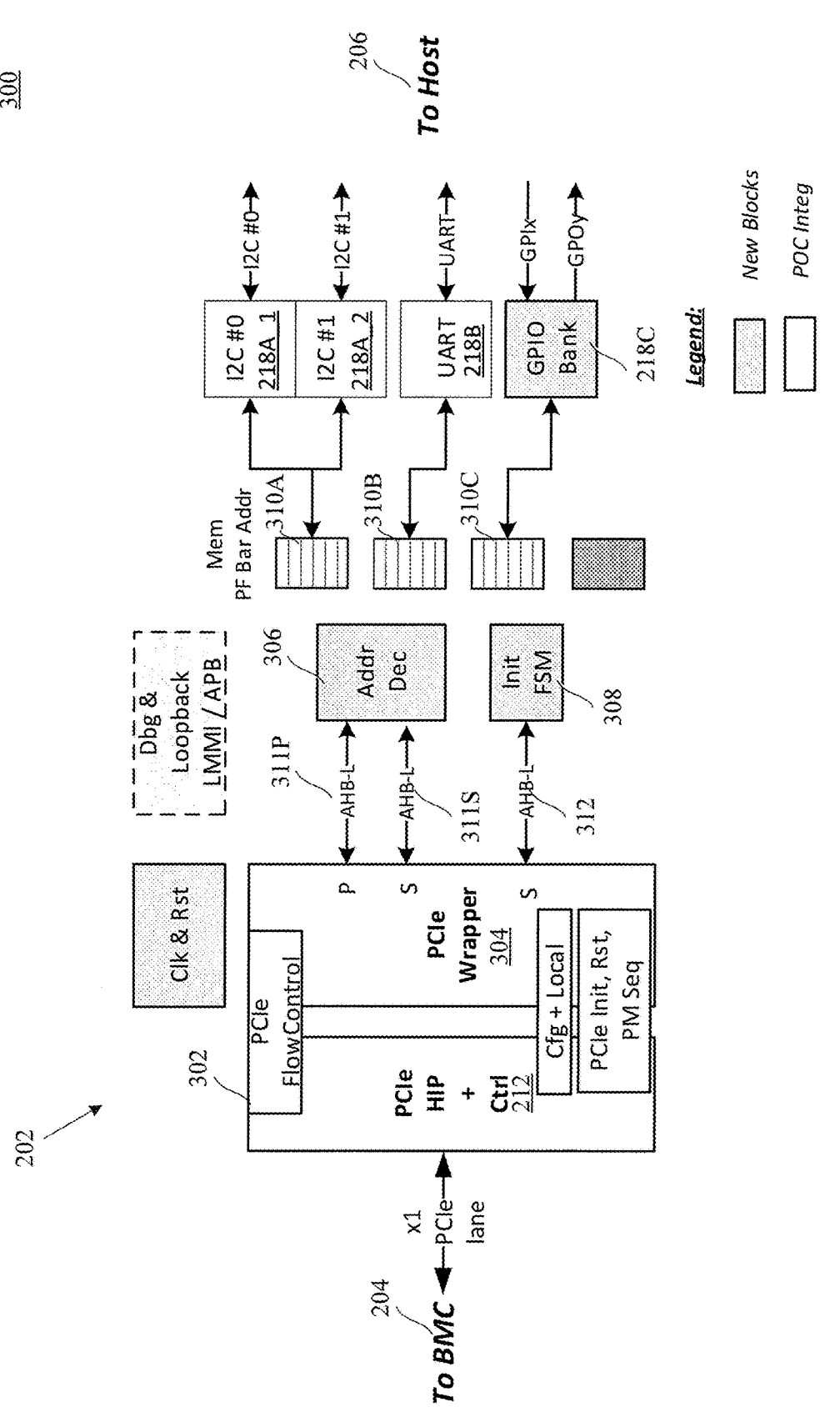
FIG. 3 illustrates an example hardware architecture for establishing communication between a BMC and an HPM, according to some embodiments.

FIG. 3 is a block diagram 300 of a hardware architecture of a port expansion FPGA that establishes communication between a BMC and an HPM, according to some embodiments. The port expansion FPGA 202 includes a PCIe endpoint 302. PCIe endpoint 302 includes a PCIe HIP and controller 212 and a PCIe wrapper 304. PCIe endpoint 302 may receive packets from BMC 204 over communication interface 209. The packets may be TLPs received and transmitted over a x1 PCIe lane. The PCIe HIP and controller 212 is responsible for decoding TLPs received from BMC 204 and encoding TLPs for transmission to BMC 204. The encoding and decoding may occur at a link layer and physical layer, as will be further discussed in detail in FIG. 5. PCIe wrapper 304 may provide an interface between PCIe HIP and controller 212 and the rest of the components in port expansion FPGA 202.

Port expansion FPGA 202 also includes an address decoder 306 and an initialization register 308. Address decoder 306 decodes and encodes virtual functions that are supported by BMC 204 and HPM 206. PCIe endpoint 302 may receive and transmit packets to and from address decoder 306 using two channels 311, a primary channel 311P and a secondary channel 311S. Channels 311 may be direction specific, such that packets travelling from BMC 204 to HPM 206 may be transmitted using channel 311P and packets travelling from HPM 206 to BMC 204 may be transmitted using channel 311S, or vice versa. Initialization register 308 may initialize registers in PCIe HIP and controller 212. To initialize registers, PCIe HIP and controller 212 may receive control information over a register access channel 312.

Address decoder 306 tunnels the transactions in the packets into memory space 310. The memory space may by a physical ransom-access memory (RAM), and may be implemented as a memory-mapped I/O (MMIO). The memory space 310 may have designated portions of memory that correspond to different I/O interfaces 218. Example memory space 310 shown in FIG. 3 may be divided into three regions, memory space 310A, memory space 310B, and memory space 310C. In some instances, memory spaces 310A-C may be implemented using a first in, first out (FIFO) functionality, such that the transactions stored in memory space 310 first, also leave memory space 310 first. Each memory space 310A-C may correspond to a memory address stored in a base address register (BAR).

In some embodiments, physical functions may correspond to multiple BAR addresses in the memory spaces 310. For example, each physical function may correspond to six BAR addresses. In this way, the memory mapped FIFOs act as transmitter and receiver buffers for I/O interfaces 218. The GPIO 218C may be mapped to byte banks per input and output direction. The highest priority GPIO 218C may be an interrupt that is mapped to INT or MSI. Further the I/O interface 218 level priority may be assigned outside of the PCIe transport layer. Further, virtual I/O drivers 208 may interface with an PCIe EP driver.

As transactions, such as data and commands, are passed from BMC 204 to HPM 206, address decoder 306 may assign transactions to one of memory spaces 310A-C. Memory spaces 310A-C may act as virtual functions and distribute transactions to corresponding I/O interfaces 218A-C when transactions are transmitted to HPM 206 and retrieve transactions from I/O interfaces 218A-C when the transactions are transmitted to BMC 204. In some instances, memory space 310A may correspond to I2C #2 218A_1 and I2C #1 218A_2, memory space 310B may correspond to UART 218B, and memory space 310C may correspond to GPIO 218C. Some memory spaces 310, such as memory space 310A may correspond to multiple I/O interfaces 218, such as I2C #0 218A_1 and I2C #1 218A_2. In this case, address decoder 306 may assign a tag indicating that the transaction may be transferred to or be received from I2C #0 218A_1 or I2C #1 218A_2.

Table I, below, illustrates a mapping between I/O interfaces 218A-C and memory spaces 310A-C implemented as a MMIO. For example, I/O interfaces I2C 218A_1 (I2C #0) and I2C 218A_2 (I2C #1) are mapped to the memory space 310A at PF BAR 1 and BAR 2 respectively. As discussed above, I2C #0 218A_1 and I2C #1 218A_2 are mapped to PF #0. I/O interface GPIO 218C is mapped to memory space 310C at PF BAR 1. Additionally, an optional Mx GPIO (not shown in FIG. 3), may also be mapped to PF BAR 1. As discussed above, GPIO 218C is mapped to PF #1. I/O interface UART 218B is mapped to memory space 310B at PF BAR 2. As discussed above, UART 218B is mapped to PF #2. Also, in the example Table I, PF #3 is not used, and may be saved for future I/O interfaces 218.

TABLE I

| Physical Function | IO Interfaces | MMIO Map |
|---|---|---|
| PF 0 | I2C0 | BAR 1 |
| | I2C1 | BAR 2 |
| PF 1 | Nx GPIO | BAR 1 |
| | Optional Mx GPIO | BAR 1 |
| PF2 | UART | BAR 2 |
| PF3 | Not Used | |

Notably, the embodiments in Table I are exemplary, and other mappings are possible.

In some embodiments, because the I/O interfaces 218A-C are grouped according to physical functions, BMC 204 or HPM 206 may apply priority to different signals in the packets. For example, if I2C 218A experiences a lot of traffic, more bandwidth may be allocated to PF #0 that corresponds to I2C 218A. Also, if I2C 218A carries critical data such as CPU temperature or voltage, I2C 218A may operate at a faster bandwidth. On the other hand, if UART 218B sends telemetry data, UART 218B may operate at a slower bandwidth than I2C 218A.

In some instances, memory allocation to memory spaces 310A-C may be static, with each PF BAR corresponding to an address in memory space 310. In other instances, memory allocation to memory spaces 310A-C may be dynamic, with each PF BAR changing memory allocations. Thus, when there is a lot of traffic across I2C 218A, address decoder 306 may allocate more memory from memory space 310 for memory space 310A than for memory space 310B or 310C. Typically, the memory in memory space 310 may be reallocated when port expansion FPGA 202 is idle.

As discussed above, physical functions route access to I/O interfaces 218A-C. Further transactions encapsulated in the packets may include interface IDs (IIDs). The IIDs correspond to physical functions #0-#2 and I/O interfaces 218A-C. Table II, below, illustrates an exemplary mapping between the I/O interfaces 218 and IIDs:

TABLE II

| Physical Function | IO Interfaces | Interface ID (IID) |
|---|---|---|
| PF 0 | I2C0 | IID = 0 |
| | I2C1 | IID = 1 |
| PF 1 | Nx GPIO | IID = 2 |
| | Optional Mx GPIO | IID = 3 |
| PF2 | UART | IID = 4 |
| PF3 | <others> | TBD |

The IIDs provide flexibility in managing the priority, bandwidth allocation, and latency and may be set at BMC 204.

In some embodiments, a physical function, such as PF #0, is mapped to I2C #0 218A_1 and I2C #1 218A_2 and provides various functionalities to I2C #0 A_1 and I2C #1 A_2. Multiple I2C targets may be mapped to PF #0. In this case, the ordering of the targets may be maintained within the I2C #0 218A_1 and I2C #1 218A_2 accesses. The ordering may be made using a round-robin or another mechanism. The I2C #0 218A_1 and I2C #1 218A_2 writes are posted transactions, while I2C #0 218A_1 and I2C #1 218A_2 reads are non-posted transactions. Further, the ordering is not maintained across different physical functions, such as PF #0, PF #1, and PF #2. The I2C #0 218A_1 and I2C #1 218A_2 may also be targeted for memory read and memory write access. In some embodiments, a physical function, such as PF #1, is mapped to GPIO 218C and provides various functionalities. Multiple GP input pins may be mapped to a GPIO bank that includes GPIO 218C. Further multiple banks may be allocated to different packets. The GPIO outputs may be posted transactions, while GPIO inputs may be non-posted transactions. For the non-posted transactions, HPM 206 may select a polling or an interrupt mechanism to access data. Further, ordering may be maintained across multiple GPIO banks, but ordering may not be maintained across different physical functions, such as PF #0, PF #1, and PF #2. Further GPIO 218C may also be targeted for memory read and memory write access.

In some embodiments, a physical function, such as PF #2, is mapped to UART 218B and provides various functionalities. The UART 218B Tx pins (for transmitting transactions) and Rx pins (for receiving transactions) are mapped to the memory read and memory write accesses. The Tx pin accesses are posted transactions, while Rx pin accesses are non-posted transactions. Further, ordering may be maintained across multiple UART 218B, but ordering may not be maintained across different physical functions, such as PF #0, PF #1, and PF #2.

A TLP protocol facilitates data transfer via TLPs between BMC 204 and HPM 206. Each TLP may be in a preset format that includes a prefix, a header, a payload, and a digest. The payload of the TLP may be formatted into a data structure that indicates the I/O interface 218A-D that may be used to transmit or receive the transaction in the TLP payload of the TLP. Both BMC 204 and HPM 206 may format the data in the payload of the TLP into a data structure. FIG. 4A is a block diagram 400A of a data structure for an application command and data format, according to some embodiments. FIG. 4A illustrates a data structure 402 within the TLP payload. The TLPs that include data structure 402 in the TLP payload may be transmission packets. The command packet may be an eight byte instruction, e.g., GPIO out banks grouped in eight wires. The data may be in multiple bytes of write transfers.

The data structure 402 includes an optional host port field 404, an internal interface identifier field 406, an interface type field 408, a response requirement field 410, a reserved field 412, a length field 414 and a payload 416. The host port field 404 may be a four byte optional field and may correspond to a port associated with HPM 206. In some instances, if there is a point-to-point connection between HPM 206 and port expansion FPGA 202, host port field 404 is not needed and may be set to a predefined value or left blank. On the other hand, if one BMC 204 is connected to multiple HPMs 206, host port field 404 may correspond to a port associated with HPM 206. The internal interface identifier field 406 may be a four byte field that specifies an interface identifier associated with one of I/O interfaces 218 that may communicate with HPM 206. The interface type field 408 may be a four byte field that specifies an identify of the I/O interface 218, such as I2C, GPIO, UART, etc. The response requirement field 410 is a one byte field that identifies whether there will be a response message (e.g., such as when a command is to read data). The reserved field may be three bytes and be reserved for future use. The length field 414 is a twelve byte field that identifies the length of the payload. If the length field 414 is set to zero, then there may not be a payload. The payload 416 has a size indicated by length field 414 and includes data.

FIG. 4B is a block diagram 400B of a data structure of an application response and data format, according to some embodiments. FIG. 4B illustrates a data structure 422 within the TLP payload. The TLPs having the data structure 422 in the TLP payload may be the response packets. The response packet may be an eight byte instruction, e.g., completion code. The data may be in multiple byes of write transfers. The GPIO in banks may be grouped in eight wires.

The data structure 422 includes an optional host port field 424, an internal interface identifier field 426, an interface type field 428, a completion code field 430, a length field 434, and a payload 436. The host port field 424 may be a four byte optional field and may correspond to a port associated with HPM 206. In some instances, if there is a point-to-point connection between HPM 206 and port expansion FPGA 202, host port field 424 is not needed and may be set to a predefined value or left blank. The internal interface identifier field 426 may be a four byte field that specifies an interface identifier associated with I/O interfaces 218. The interface type field 428 may be a four byte field that specifies an identify of the I/O interface 218, such as I2C, GPIO, UART, etc. The completion code field 430 may be a four byte field that identifies a completion code. The length field 434 is a twelve byte field that identifies the length of the payload. The payload may include data from HPM 206. If the length field 434 is set to zero, then there may not be a payload. This can occur when there is a response that a write command is complete. On the other hand, if the response is a read response, payload 436 may include the data. The payload 436 has a size indicated by length field 434 and includes data.

In some embodiments, completion code field 430 may store multiple completion codes. Table III, below, illustrates exemplary completion codes:

TABLE III

| ID (4b) | Code | Comment |
|---|---|---|
| 0x1 | Error | Error |
| 0x2 | Retry | Request the agent to retry immediately |
| 0x3 | Delay__Retry | Request the agent to retry after fixed delay. The delay time is parameter pre-negotiated, e.g. 100 us |

TABLE III-continued

| ID (4b) | Code | Comment |
|---|---|---|
| 0x4 | Terminate | Completed with error, no retry requested |
| 0xF | Complete | No error |
| <others> | Reserved | |

I/O interfaces 218 may be assigned a priority. The priority is assigned outside of the TLP payload, and may be included in a priority table that may be stored in BMC 204 or HPM 206. Priority for I/O interfaces 218 may be determined using various priority algorithms, such as a round robin algorithm. The priority may have multiple levels, such as high (P1), medium (P2), and low (P3), where the smaller number (P1) corresponds to a higher priority or vice versa. An example priority table IV, illustrates priority for I/O interfaces 218 corresponding to interface IDs 1 through 6:

TABLE IV

| IID | ITY | Priority |
|---|---|---|
| 0x1 | 0x1 | 0x1 (P1) |
| 0x2 | 0x2 | 0x3 (P3) |
| 0x3 | 0x1 | 0x1 (P1) |
| 0x4 | 0x4 | 0x2 (P2) |
| 0x5 | 0x3 | 0x1 (P1) |
| 0x6 | 0x1 | 0x3 (P3) |
| <others> | WIP | |

In some embodiments, instead of using virtual channels, BMC 204 or HPM 206 may program a memory address that may store the payload in the TLPs. For example, memory addresses in a first range (e.g., 0 to <2K) may correspond to I2C #0 218A_1, memory addresses in a second range (e.g., 2K to <4K) may correspond to I2C #1 218A_2, memory addresses in a third range (e.g., 4K to <6K) may correspond to GPIO 218C, and memory addresses in a fourth range (e.g., 6K to <8K) may correspond to UART 218B. In some embodiments, the first range may be 0-2K, the second range may be 2K-4K, the third range may be 4K-6K, and the fourth range may be 6K-8K.

Figure 5:
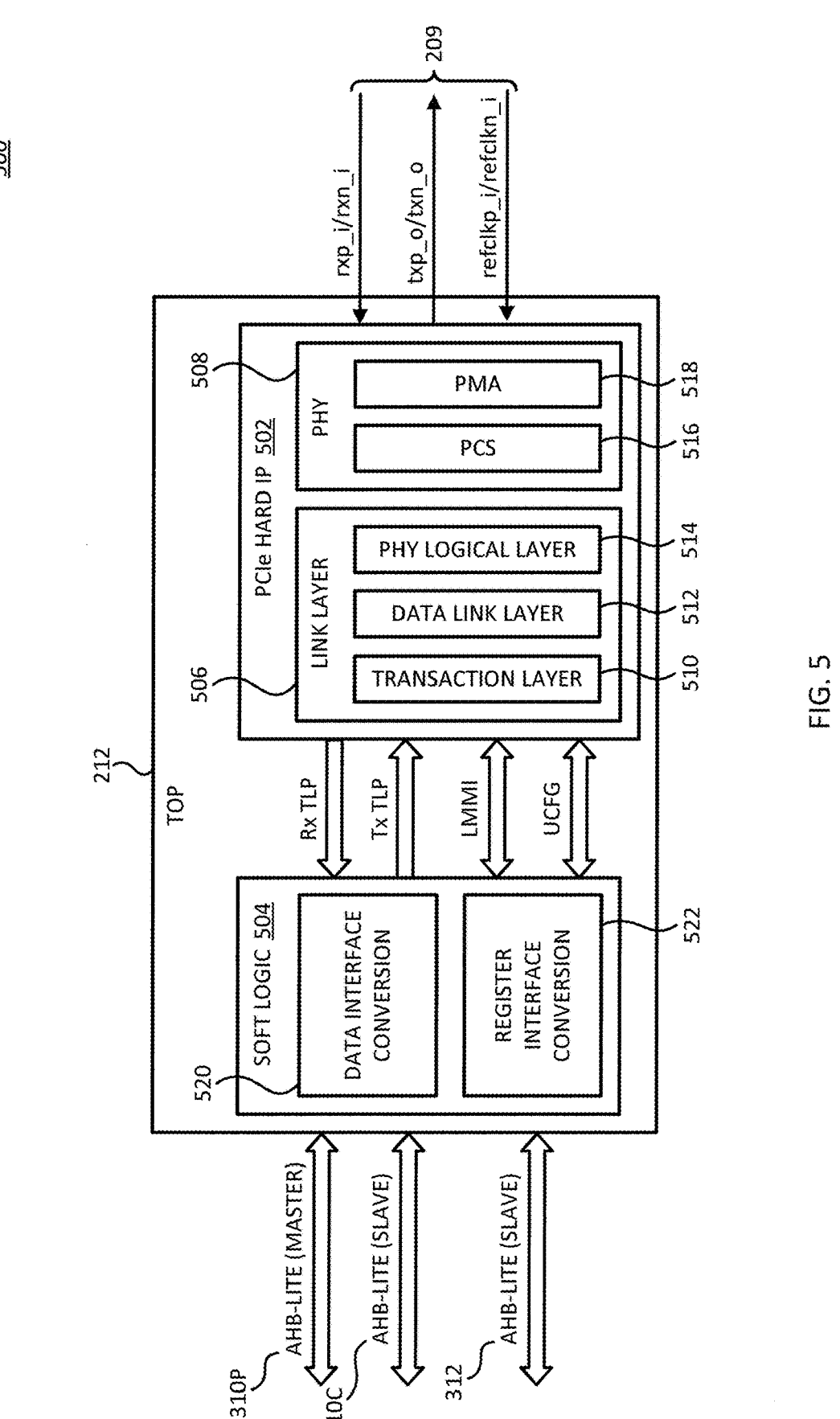
FIG. 5 is a block diagram illustrating a Peripheral Component Interconnect Express (PCIe) hard IP (HIP) and Controller, according to some embodiments.

FIG. 5 is a block diagram 500 illustrating a PCIe HIP and Controller 212, according to some embodiments. PCIe HIP and Controller 212 includes a PCIe hard IP 502 and a software logic 504. PCIe Hard IP includes a link layer 506 and a physical layer 508.

PCIe hard IP 502 decodes TLPs received from BMC 204 over communication interface 209. The TLPs include transactions or commands in the TLP payload. The transactions are passed to the I/O interfaces 218 using channel 311P for data or channel 312 for commands, and then to HPM 206 over communication interface 210. PCIe hard IP 502 also receives transactions from HPM 206 over channel 311S for data or channel 312 for commands, assembles TLPs to include the transactions in the TLP payload, and transmits the TLPs to BMC 204 over communication interface 209.

Link layer 506 includes a transaction layer 510, a data link layer 512, and a physical logic layer 514. Transaction layer 510 is an upper layer and may assemble and disassemble TLPs. As discussed above, TLPs may communicate transactions, such as read, and write transactions, and also events. Data link layer 512 is between transaction layer 510 and physical logic layer 514. Data link layer 512 may manage data integrity, including error detection and correction. During transmission, data link layer 512 receives TLPs from transaction layer 510 and applies data protection and sequence number and submits TLPs to the physical layer.

During reception, data link layer 512 checks the integrity of TLPs and passes TLPs to transaction layer 510. Physical logic layer 514 includes physical circuitry for transmission of TLPs.

Physical layer 508 includes a physical coding layer (PCS) 516 and a physical medium attachment (PMA) 518. PMA 518 receives and transmits high-speed serial data on the serial lanes, such as 1x PCIe lane of communication interface 209. PCS 516 interfaces between PMA 518 and the PCIe controller (not shown), and performs various functions, including data encoding/decoding, scrambling/descrambling, block synchronization, and the like.

Software logic 504 includes a data conversion interface 520 and register conversion interface 522. Data conversion interface 520 converts the data structure 402 received in the TLP payload into the format specific to port expansion FPGA 202 for transmission over channel 311P and vice versa. Register conversion interface 522 converts commands in data structure 402 received in the TLP payload into the format specific to port expansion FPGA 202 for transmission over channel 312 and vice versa.

Figure 6:
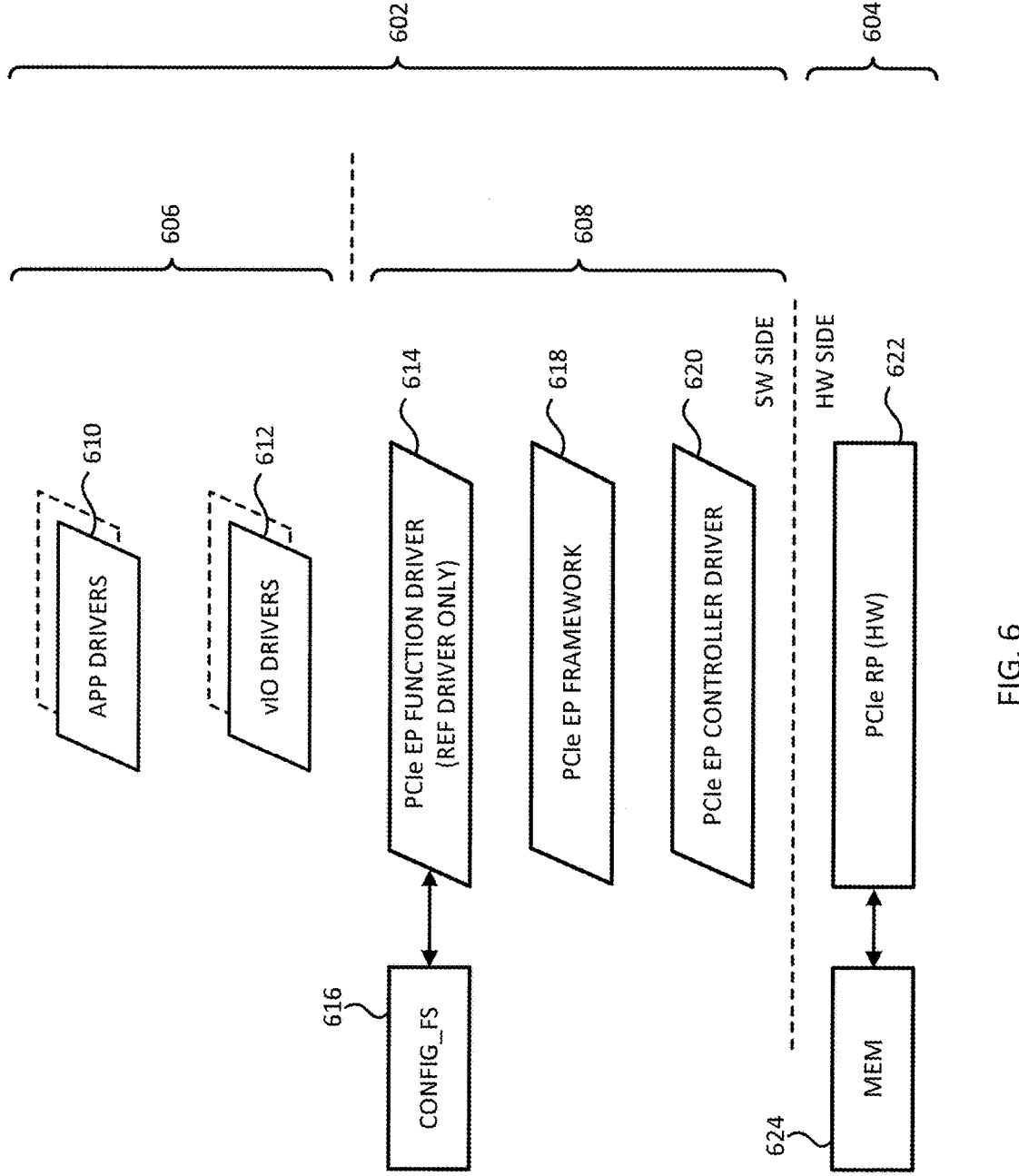
FIG. 6 is a diagram of a software stack of a BCM, according to some embodiments.

FIG. 6 is a diagram 600 of a software stack of a BMC, according to some embodiments. As illustrated in FIG. 6, software stack 602 interacts with a hardware side 604. Software stack 602 may be divided into a user space 606 and a kernel space 608. User space 606 includes application driver(s) 610 and virtual I/O driver(s) 612. Kernel space includes a PCIe function driver 614 and a corresponding configuration file 616, a PCIe framework 618, and a PCIe controller driver 620.

Application drivers 610 may perform various functions, such as allocating bandwidth for I/O interfaces 218, controlling temperature, controlling BIOS flash security, controlling LEDs, and controlling the power rail.

Virtual I/O driver(s) 612 (which may be one of drivers 208 discussed above) may configure various virtual I/Os that map to I/O interfaces 218. In particular, virtual I/O drivers 612 may define virtual I/Os using the format discussed in FIG. 4, and Tables I-IV above.

PCIe function driver 614 and configuration file 616 may be provided and/or programmed by HPM 206 and stored at BMC 204. PCIe function driver 614 (which may be one of drivers 208 discussed above) initializes and manages an application layer of the TLP. PCIe function driver 614 may provide a mapping between virtual I/Os and the various peripheral applications from which BMC 204 may collect information. Configuration file 616 may vary depending on the type of platform associated with HPM 206.

PCIe framework 618 and PCIe controller driver 620 may be software that causes BMC 204 to communicate with port expansion FPGA 202.

As discussed above, hardware side 604 includes PCIe RP 622 and memory 624. PCIe RP 622 in BMC 204 initiates and manages port expansion FPGA 202.

FIG. 7 is a flowchart of an exemplary method 700 for communicating transactions between BMC and HPM, according to some embodiments. Notably, method 700 is exemplary and other methods may also be used. The operations 702-710 in method 700 may be implemented using the hardware circuitry discussed in FIGS. 1-6. Note that one or more of the operations may be deleted, combined, or performed in a different order as appropriate.

At operation 702, packets are communicated from BMC to PCIe endpoint at port expansion FPGA 202. For example, BMC 204 communicates packets to PCIe endpoint 302 of port expansion FPGA 202 over communication interface

209. The packets may be TLPs and include aggregated transactions with virtual I/O function in the in the TLP payload.

At operation 704, transactions are extracted. For example, software logic 504 extracts the transactions from the TLP payload.

At operation 706, information in the transactions is decoded. For example, address decoder 306 may decode physical and/or virtual functions included in the transaction information. Based on the mapping between physical functions and I/O interfaces, address decoder 306 may map the transactions to one of memory spaces 310A-C that is associated with respective I/O interfaces 218A-C.

At operation 708, transactions are stored in memory spaces 310. For example, address decoder 306 maps the transactions to memory spaces 310A-C that are associated with respective I/O interfaces 218A-C. The transactions from multiple TLPs may be aggregated in memory spaces 310A-C before being transmitted via I/O interfaces 218A-C to HPM 206.

At operation 710, transactions are communicated to HPM. For example, I/O interfaces 218A-C communicate the transactions in corresponding I/O interface formats from respective memory spaces 310A-C associated with I/O interfaces 218A-C to HPM 206.

FIG. 8 is a flowchart of an exemplary method 800 for communicating transactions between HPM and BMC, according to some embodiments. Notably, method 800 is exemplary and other methods may also be used. The operations 802-810 in method 800 may be implemented using the hardware circuitry discussed in FIGS. 1-6. Note that one or more of the operations may be deleted, combined, or performed in a different order as appropriate.

At operation 802, transactions are communicated from HPM. For example, HPM 206 may communicate transactions using I/O interfaces 218A-C to respective memory spaces 310A-C associated with I/O interfaces 218A-C.

At operation 804, transactions are stored. For example, transactions are stored in memory spaces 310A-C that correspond to I/O interfaces 218A-C.

At operation 806, transactions are encoded. For example, address decoder 306 may encode physical and virtual functions included in the transactions. Based on the mapping between physical functions and I/O interfaces, address decoder 306 may map the transactions in memory spaces 310A-C to corresponding physical or virtual functions of the PCIe endpoint 302. Encoded transactions are transmitted to PCIe endpoint 302 using channel 311S (for data transactions) or channel 312 (for command transactions).

At operation 808, packets are generated. For example, PCIe endpoint 302 may use software logic 504 to generate TLPs that include the transactions with virtual functions in the TLP payload.

At operation 810, the TLPs are communicated to BMC. For example, PCIe endpoint 302 may communicate TLPs from port expansion FPGA 202 to BMC 204 over communication interface 209.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:
an endpoint configured to:
  receive a plurality of packets over a first communication interface from a baseboard management controller (BMC), wherein payloads of the plurality of packets include transactions; and
  extract the transactions from the payloads of the plurality of packets;
an address decoder configured to:
  decode, using information in the transactions, addresses of a memory space, wherein the memory space is divided into designated portions with each portion of the memory space corresponding to one of a plurality of second communication interfaces of the endpoint; and
  tunnel the transactions into the addresses corresponding to the portions of the memory space;
the memory space comprising the designated portions configured to store the transactions according to the decoded addresses; and
the plurality of the second communication interfaces configured to receive the transactions from the portions of the memory space and transmit the transactions to a host processing module (HPM).

2. The system of claim 1, wherein the endpoint is a Peripheral Component Interconnect Express (PCIe) endpoint and the first communication interface is a PCIe interface.

3. The system of claim 1, wherein the plurality of second communication interfaces are Low-Voltage Differential Signaling (LVDS) tunneling protocol interface (LTPI IP) interfaces of different types.

4. The system of claim 1, wherein a physical function in plurality of physical functions corresponds to at least two addresses in a portion of the memory space.

5. The system of claim 1, wherein a plurality of physical functions and the plurality of second communication interfaces correspond to interface identifiers included in the transactions.

6. The system of claim 5, wherein a physical function in the plurality of physical functions corresponds to at least two interface identifiers.

7. The system of claim 5, wherein one second communication interface in the plurality of second communication interfaces corresponds to one interface identifier.

8. The system of claim 5, wherein the interface identifiers and the plurality of second communication interfaces are assigned corresponding priorities for passing the transactions to and from the HPM.

9. The system of claim 1, wherein a payload of a packet in the plurality of packets includes a transaction formatted into a data structure, and wherein the data structure includes at least a virtual interface identifier field, an interface type field, a request response field, a length field, and a payload field, wherein the payload field corresponds to a size of data in the transaction specified in the length field.

10. The system of claim 1, wherein a payload of a packet in the plurality of packets includes a transaction formatted into a data structure, and wherein the data structure includes at least a virtual interface identifier field, an interface type field, a completion code field, a length field and a payload field, wherein the payload field corresponds to a size of data in the transaction specified in the length field.

11. A method comprising:
communicating, to an endpoint from a baseboard management controller (BMC), a plurality of packets over a first communication interface, wherein payloads in the plurality of packets include transactions to be communicated using a plurality of second communication interfaces to a host processing module (HPM);
decoding, using an address decoder and information in the transactions, addresses in memory space, wherein the memory space is divided into portions with each portion corresponding to one of the plurality of the second communication interfaces associated with the endpoint;
tunneling the transactions into the addresses corresponding to the portions of the memory space;
storing the transactions in the portions of the memory spaces according to the tunneling; and
communicating, using the plurality of second communication interfaces, the transactions from the portions of memory space to the HPM.

12. The method of claim 11, wherein the endpoint is a Peripheral Component Interconnect Express (PCIe) endpoint, a first interface is a PCIe interface and the plurality of second communication interfaces are Low-Voltage Differential Signaling (LVDS) tunneling protocol interface (LTPI IP) interfaces.

13. The method of claim 11, wherein a physical function in a plurality of physical functions is associated with a portion in the portions of the memory space and the plurality of functions and the plurality of second communication interfaces correspond to interface identifiers included in the transactions.

14. The method of claim 13, wherein one second communication interface in the plurality of second communication interfaces corresponds to one interface identifier in the interface identifiers.

15. The method of claim 13, wherein the interface identifiers and the plurality of second communication interfaces are assigned a plurality of priorities for communicating the transactions to and from the HPM.

16. The method of claim 11, wherein a payload of a packet in the plurality of packets includes a transaction formatted into a data structure, and wherein the data structure includes at least a virtual interface identifier field, an interface type field, a length field and a payload field, wherein the payload field corresponds to a size of data in the transaction.

17. The method of claim 16, further comprising:
installing a driver at the BMC corresponding to the data structure.

18. The method of claim 11, wherein the portions of the memory space are first-in, first-out memory spaces.

19. A method comprising:

communicating transactions using a plurality of input/output (I/O) interfaces from a host processing module (HPM), wherein the plurality of the I/O interfaces are in different formats;

storing the transactions in a memory space divided into designated portions of the memory space, wherein each portion corresponds to a different I/O interface in the plurality of I/O interfaces;

encoding, using an address decoder and information in the transactions, the transactions from the different portions of the memory space to corresponding physical functions of an endpoint;

generating, using the endpoint, transaction layer packets from the encoded transactions, wherein the transactions are included in payloads of the transaction layer packets; and transmitting, using a high speed interface, the transaction layer packets to a baseboard management controller (BMC).

20. The method of claim 19, wherein a payload of a transaction layer packet includes a transaction formatted into a data structure, and wherein the data structure includes at least a virtual interface identifier field, an interface type field, a length field and a payload field, wherein the payload field corresponds to a size of data in the transaction.

* * * * *